J. H. MILLER.
PLANTER MARKER.
APPLICATION FILED AUG. 29, 1910.
1,028,375.
Patented June 4, 1912.
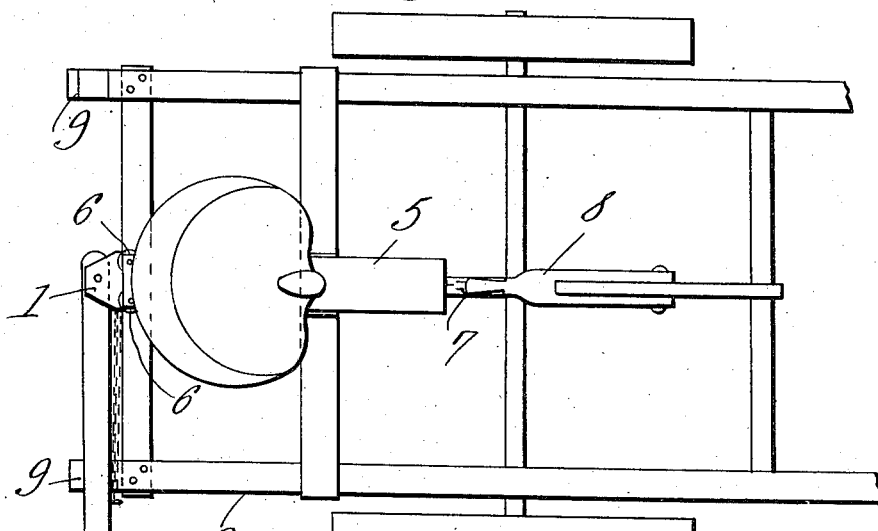
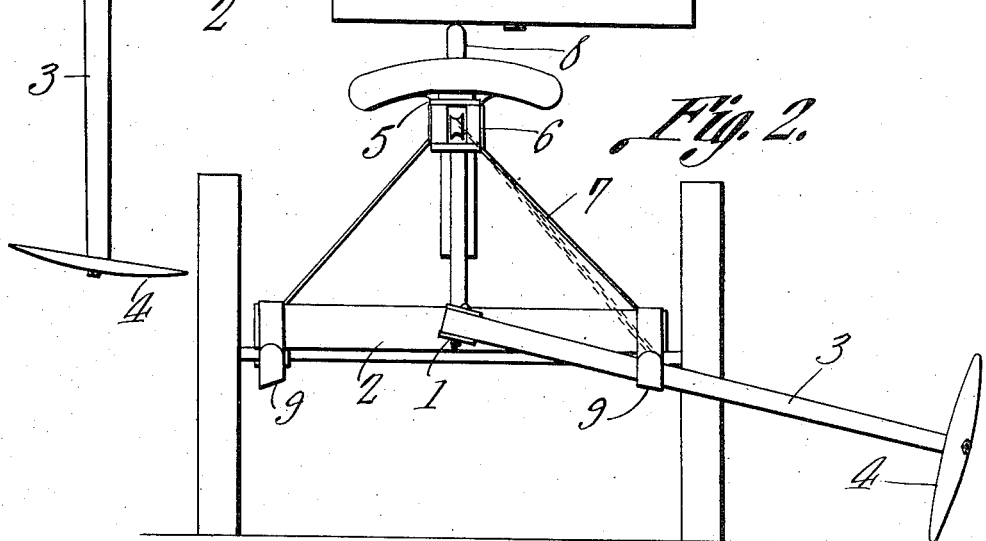
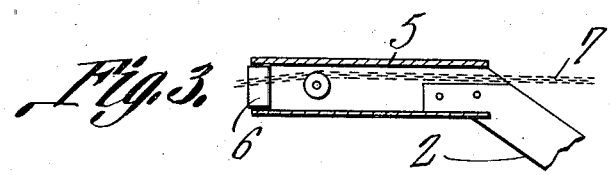
Witnesses
John H. Miller, Inventor
by C. A. Snow & Co. Attorneys

UNITED STATES PATENT OFFICE.

JOHN H. MILLER, OF NEW WESTON, OHIO.

PLANTER-MARKER.

1,028,375.  Specification of Letters Patent.  Patented June 4, 1912.

Application filed August 29, 1910. Serial No. 579,574.

*To all whom it may concern:*

Be it known that I, JOHN H. MILLER, a citizen of the United States, residing at New Weston, in the county of Darke and State of Ohio, have invented a new and useful Planter-Marker, of which the following is a specification.

This invention has relation to planter markers and consists in the novel construction and arrangement of its parts hereinafter shown and described.

The object of the invention is to provide a marker of simple structure adapted to be applied to the frame of a corn or other planter and having its parts so arranged that the marker proper may be readily swung from one side of the frame of the planter to the other and vice versa.

With this object in view the structure includes a cuff which is pivotally attached to the rear portion of the frame of the planter and in which is pivotally connected the inner end of an arm. A disk or other form of marker is attached to the outer end portion of the said arm and brackets are provided at the rear end portion of the frame of the planter and at the opposite sides thereof and are adapted to receive the intermediate portion of the said arm. A guide is mounted upon the frame of the planter and is provided with a number of friction rolls. A flexible member is trained through the said guide and between the said rolls and is connected at one end with the said arm and at its other end is attached to a lever which is fulcrumed upon the frame of the planter within convenient reach of one occupying the seat of the planter.

In the accompanying drawings:—Figure 1 is a top plan view of a portion of a planter frame with the marker attached thereto. Fig. 2 is a rear elevation of the same. Fig. 3 is a detailed longitudinal sectional view of the sleeve forming a component part of the marker structure.

The marker includes a cuff 1 which is pivotally attached to the rear end portion of the planter frame 2. The inner end of an arm 3 is pivoted to the cuff 1 and a disk or other marking element 4 is attached to the outer end portion of the said arm 3. A sleeve 5 is mounted upon the frame of the planter (preferably upon the seat post thereof) and is provided in the vicinity of its rear end with a series of friction rolls 6. A flexible member 7 is trained through the sleeve 5 and is located between the friction rolls 6. The rear end of the said member 7 is attached to the intermediate portion of the arm 3 and the forward end of the said member 7 is connected to a lever 8 which in turn is fulcrumed upon the frame 2 of the planter. Brackets 9 are attached to the rear portion of the planter frame 2 in the vicinity of its side edges and are adapted to receive the intermediate portion of the arm 3 and brace the same against the strain to which it is subjected while the marker proper is in operation.

While in operation the intermediate portion of the arm 3 is received within one of the brackets 9 and the marker proper 4 is in contact with the soil. As the planter is drawn along the ground, the marker 4 opens a shallow furrow in the soil in the usual manner and when the planter is turned at the end of the row and it is desired to swing the arm 3 from one side of the planter beyond the opposite side thereof, the operator grasps the lever 8 and swings the upper end thereof in a forward direction. This movement on the part of the lever 8 moves the flexible member 7 longitudinally which in turn will swing the arm 3 in an upward direction and the momentum gained by the said arm will cause the same to swing over its pivotal connection with the frame 2 and fall in a downward direction into the other bracket 9 at the opposite side of the frame of the planter. To swing the arm 3 back into its original position the same manipulation of the lever 8 is effected. Thus it will be seen that a simple device is provided for shifting the position of the arm 3 and that when the arm is subjected to strain it is braced at a point intermediate its end by one or the other of the brackets 9.

Having described the invention, what I claim as new and desire to secure by Letters Patent is:—

In a planter marker the combination with a frame, of a cuff pivotally connected to the central portion of the frame at the rear end thereof, a marker arm pivotally connected to the cuff, a reversible marker at the outer end of said arm, supporting brackets connected to the sides of the frame at the rear end thereof, a guide sleeve supported above the frame, a transversely extending supporting roller journaled within the sleeve at a point between the ends of the sleeve, parallel upstanding guide rollers journaled within the sleeve at the rear end thereof, and a flexible actuating element extending between the guide rollers and over the supporting roller and through the sleeve, one end of said element being attached to the marker arm at a point between the ends of the arm, and means situated on the frame for actuating said element.

In testimony that I claim the foregoing as my own, I have hereto affixed my signature in the presence of two witnesses.

JOHN H. MILLER.

Witnesses:
L. O. GOSLEE,
J. R. GOSLEE.

Copies of this patent may be obtained for five cents each, by addressing the "Commissioner of Patents, Washington, D. C."